(12) United States Patent
Kumar et al.

(10) Patent No.: US 7,639,629 B2
(45) Date of Patent: Dec. 29, 2009

(54) SECURITY MODEL FOR APPLICATION AND TRADING PARTNER INTEGRATION

(75) Inventors: Vinod Kumar, Redmond, WA (US); Ashok Srinivasan, Woodinville, WA (US); Jeff Comstock, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 11/495,253

(22) Filed: Jul. 28, 2006

(65) Prior Publication Data

US 2008/0025326 A1    Jan. 31, 2008

(51) Int. Cl.
*H04J 1/16* (2006.01)
*H04L 12/56* (2006.01)

(52) U.S. Cl. .................. 370/252; 370/386; 370/389
(58) Field of Classification Search ............... 370/252, 370/401, 386, 389; 709/229; 705/64, 80
See application file for complete search history.

(56) References Cited

U.S. PATENT DOCUMENTS

| | | | |
|---|---|---|---|
| 6,061,665 A | 5/2000 | Bahreman | 705/40 |
| 6,314,468 B1 | 11/2001 | Murphy et al. | 709/236 |
| 6,373,950 B1 | 4/2002 | Rowney | 380/255 |
| 6,957,199 B1 | 10/2005 | Fisher | 705/78 |
| 7,496,750 B2 * | 2/2009 | Kumar et al. | 713/154 |
| 2003/0037153 A1 | 2/2003 | Ouchi | 709/230 |
| 2003/0046201 A1 | 3/2003 | Cheyer | 705/35 |
| 2003/0061068 A1 | 3/2003 | Curtis | 705/1 |
| 2003/0065623 A1 | 4/2003 | Corneil et al. | 705/64 |
| 2003/0065792 A1 | 4/2003 | Clark | 709/229 |
| 2003/0144967 A1 | 7/2003 | Zubeldia et al. | 705/73 |
| 2004/0078316 A1 | 4/2004 | Clark et al. | 705/37 |
| 2005/0086178 A1 | 4/2005 | Xie et al. | 705/80 |

OTHER PUBLICATIONS

"Security Framework for Trading Partner Integration," bea, http://edocs.bea.com/wli/docs81/tpintro/security.html, pp. 1-40.
"BizTalk Server 2000: Architecture and Tools for Trading Partner Integration," MSDN Magazine, The Microsoft Journal for Developers, http://www.msdn.microsoft.com/msdnmag/issues/0500/biztalk/, pp. 1-12.
"eXchange Integrator 5," Sun Microsystems, http://www.seebeyond.com/software/exchange.asp, pp. 1-2.

* cited by examiner

*Primary Examiner*—John Pezzlo
(74) *Attorney, Agent, or Firm*—Theodore M. Magee; Westman, Champlin & Kelly, P.A.

(57) ABSTRACT

A security model is provided that controls access to a secured application. Under the security model, a submitting user is authenticated when the user submits a message to have the application perform an action. The application is then used to determine if the submitting user is authorized to submit messages on behalf of a source endpoint stored in the message. A method in the application is then invoked to perform the action while impersonating a source endpoint user stored in the message.

16 Claims, 12 Drawing Sheets

SECURITY MODEL FOR APPLICATION AND TRADING PARTNER INTEGRATION

BACKGROUND

Business-to-business (B2B) integration scenarios involve an application or user in one business being able to access services and data provided by an application in another business. In application-to-application (A2A) scenarios, an application within a business accesses services and data in another application within the same business. Access to such services and data creates security holes for the application through which mischievous users may attack the application and/or steal confidential data.

The discussion above is merely provided for general background information and is not intended to be used as an aid in determining the scope of the claimed subject matter.

SUMMARY

A security model is provided that controls access to a secured application. Under the model, a submitting user is authenticated when the user submits a message to have the application perform an action. The application is then used to determine if the submitting user is authorized to submit messages on behalf of a source endpoint stored in the message. A method in the application is then invoked to perform the action while impersonating a source endpoint user stored in the message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
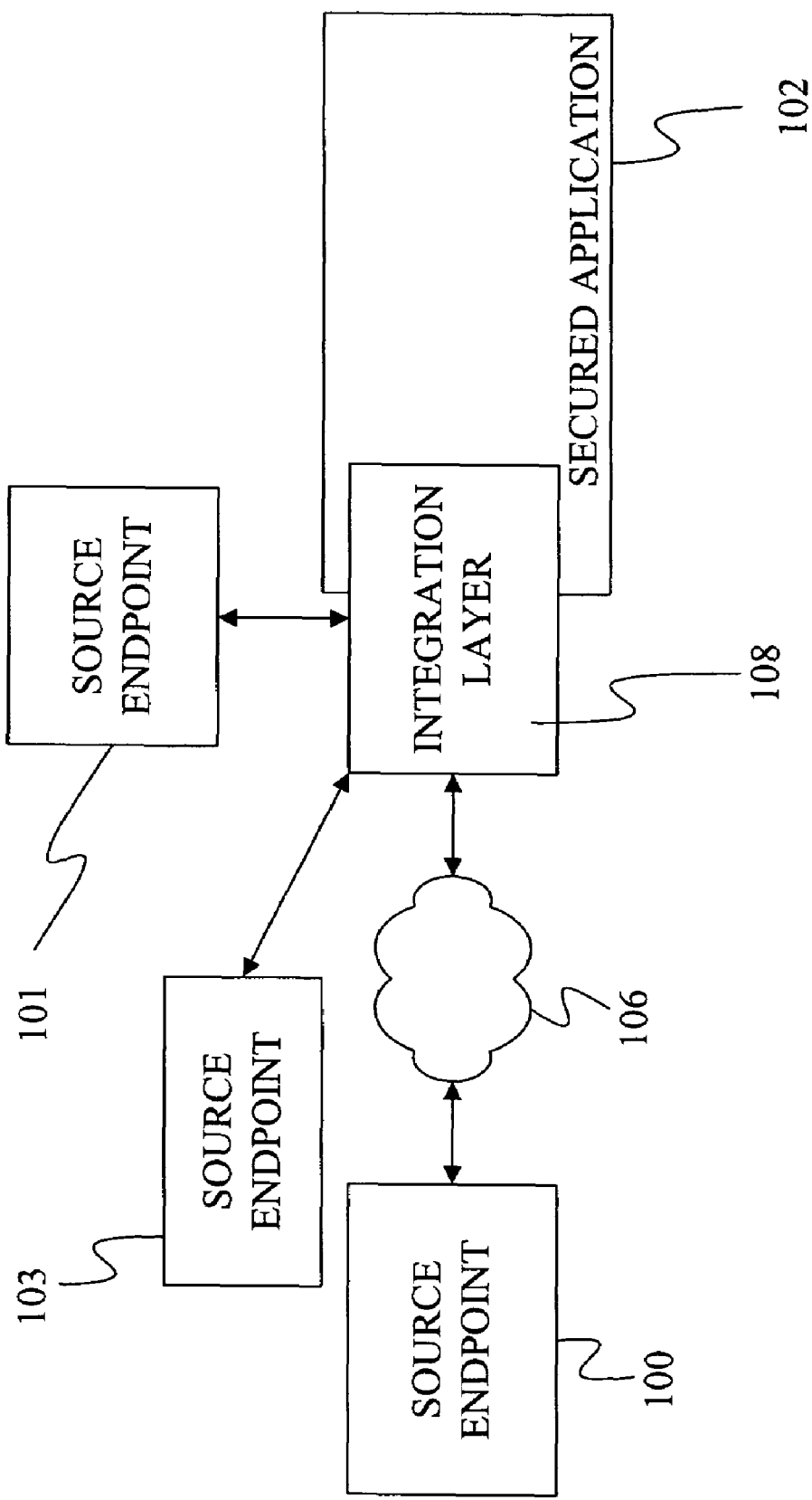
FIG. 1 is a generalized block diagram showing connections between source endpoints and a secured application.

Embodiments provided herein provide a framework or a model to provide secured access to an application. FIG. 1 provides a block diagram of elements showing the general interaction contemplated in embodiments discussed below.

In FIG. 1, an application or a user at a source endpoint 100, a source endpoint 101 or at a source endpoint 103 accesses a secured application 102. Source endpoints 100 and 103 are considered external endpoints because they are not trusted to provide certain information. Source endpoint 100 accesses secured application 102 through a network 106 and an integration layer 108. Source endpoint 103 accesses secured application 102 through integration layer 108. Source endpoint 101 also accesses secured application 102 through integration layer 108, but is trusted by secured application 102.

Integration layer 108 authenticates the user that submits messages to integration layer 108 and transfers the messages to other portions of secured application 102 for processing. In most embodiments, integration layer 108 takes the form of web services or a messaging gateway. Integration layer 108 also includes a trusted intermediary that sits between the web services or messaging gateway and source endpoints 100 and 103. Portions of integration layer 108 are considered part of secured application 102, while other portions may be outside of secured application 102.

Figure 2:
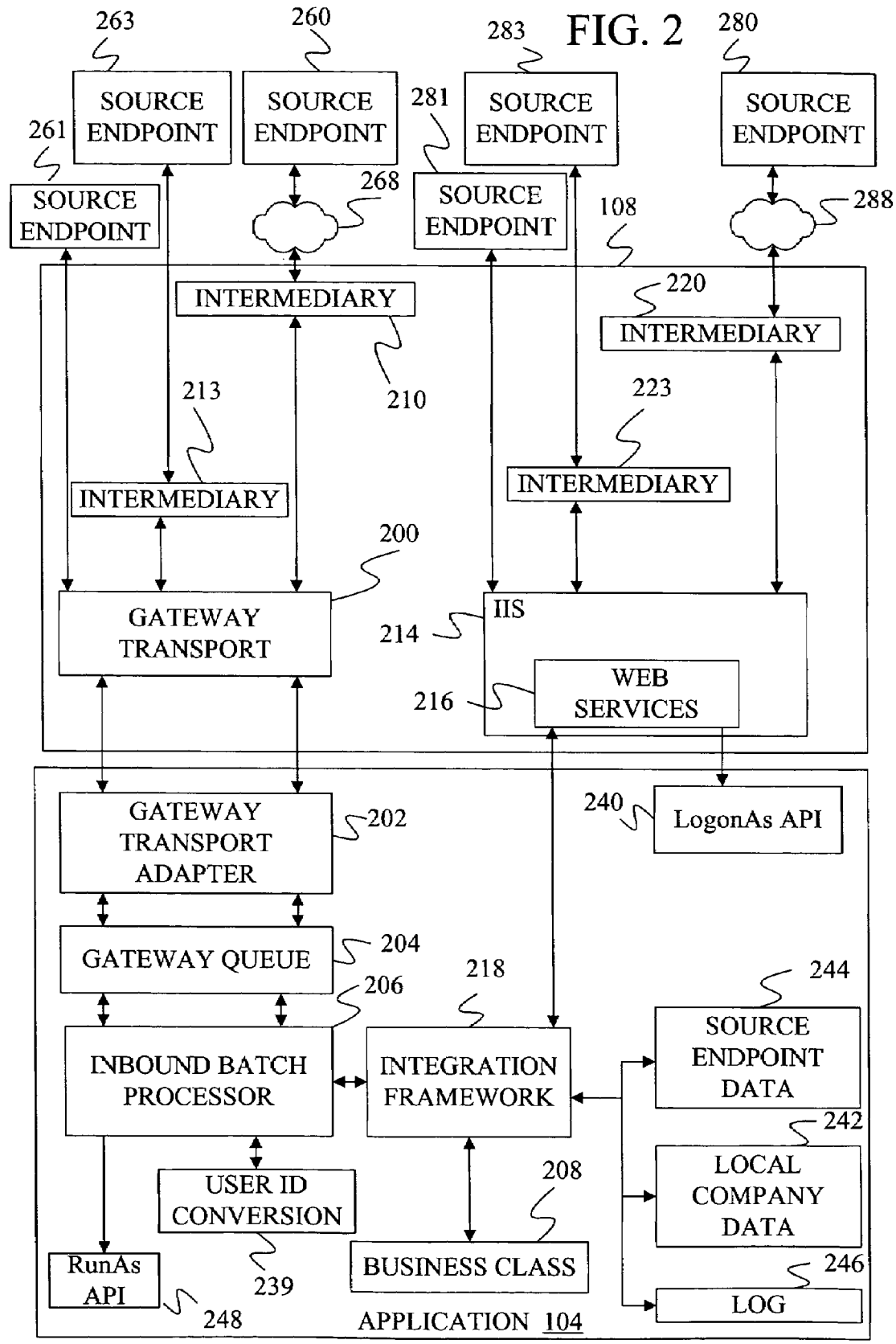
FIG. 2 is a more detailed block diagram showing the elements of FIG. 1 in more detail.

FIG. 2 provides a more detailed block diagram of the elements of FIG. 1. In FIG. 2, source endpoint 100 is depicted by two separate source endpoints 260 and 280. The source endpoints connect to integration layer 108 through respective external networks 268 and 288. Under one embodiment, networks 268 and 288 are the Internet. In other embodiments, each network is a different network connection. Source endpoint 101 is depicted as source endpoints 261 and 281. Source endpoints 261 and 281 connect to the integration layer directly or through an internal network, referred to as an intranet. Source endpoint 103 is depicted as source endpoints 263 and 283 and also connect to the integration layer directly or through an internal network.

Source endpoints 261, 263 and 260 use gateway messaging to send messages to secured application 104. Such gateway messaging can include using gateway transports such as file shares, and Microsoft Message Queueing(MSMQ). Source endpoint 261 provides messages directly to gateway transport 200 through an internal network (not shown). Source endpoint 263 sends messages to gateway transport 200 through an intermediary 213, which is on the internal network. Source endpoint 260 sends messages to an intermediary 210 through external network 268. Intermediary 210 then sends messages to gateway transport 200 directly or through an internal network (not shown).

Intermediaries 210 and 213 are authorized to submit inbound requests on behalf of their respective source endpoints. An intermediary can be any logical "middle man", such as an application or a server, between the source endpoint and the application that is trusted by the application. Intermediaries 210 and 213 are trusted to reliably and accurately indicate who has submitted a request to the intermediary. A trusted intermediary has the following characteristics:

a. A user account (known as an intermediary user) for the trusted intermediary must be established in the application that allows the trusted intermediary to submit requests;

b. The trusted intermediary must be configured to submit on behalf of the source endpoint;
c. The trusted intermediary must set the source endpoint user (described further below) using some form of authentication;
d. There can be multiple trusted intermediaries for a single source endpoint.

A gateway transport adapter 202 takes the messages from gateway transport 200 and places them in a gateway queue 204. An inbound batch processor 206 periodically scans gateway queue 204 for new messages, retrieves the messages and processes them using integration framework 218 as described further below.

Source endpoint 281 sends messages to secured application 104 by sending messages directly to Internet Information Server (IIS) 214 to invoke web services 216. Typically, source endpoint 281 is on the same internal network as IIS 214. Source endpoint 283 sends messages to secured application 104 by sending messages through intermediary 223, which in turn sends messages to IIS 214. Source endpoint 283 and intermediary 223 are on the same internal network as IIS 214. Source endpoint 280 sends messages to secured application 104 by communicating with an intermediary 220 through external network 288. The intermediary then sends messages to IIS 214 to invoke web services 216. Typically, intermediary 220 is on the same internal network as IIS 214.

Web services 216 communicate with integration framework 218 in application 104 in order to perform an action associated with the message. Integration framework 218 processes the message to perform the action as described further below.

Under one embodiment, every inbound message to the messaging gateway or to the web services specifies the following message header data: source endpoint, destination endpoint, source endpoint user (optional), action and message ID. In addition, each message must have an associated submitting user.

The source endpoint identifies the partner or application that is associated with the production of the inbound message. Each source endpoint must be registered with the secured application and data related to the source endpoint must be stored during the registration. This data includes source endpoint user accounts that are associated with the source endpoint, trusted intermediary users that the source endpoint can pass its messages through, and actions that the source endpoint can activate.

The source endpoint user is the user account associated with the source endpoint that is attempting to execute the action described in the payload of the message. During execution of the action, account information for this source endpoint user will be used to run the application on behalf of the user so that changes in the database associated with the action of the message can be logged as being performed by the source endpoint user and in some embodiments so that row level security can be implemented to limit database access for the source endpoint user.

The source endpoint user is either set by the intermediary or is set to match the submitting user, which is the user account that provides the message to the gateway transport or web services. Source endpoints are not allowed to set the source endpoint user directly.

The destination endpoint identifies an account, sometimes referred to as a company, within the secured application. Each account or company has an associated set of database entries and database table structures. Each message is only allowed to affect data associated with the company associated with the destination endpoint in the message header.

The source endpoint and the destination endpoint are typically placed in the header by the source endpoint or by the intermediary, if an intermediary is used. When an intermediary is used, the source endpoint user is added by the intermediary based on its authentication of the source endpoint user. When an intermediary is not used, the source endpoint user is set to match the submitting user.

The action specifies the operation to be performed by the business class in the secured application. Each action maps to a business class and a method within that class that will perform the action. For web services, each web service method is associated with a different action. As a result, the act of calling the web service method results in selecting an action. In such embodiments, the action does not need to be listed in the message header.

A message ID provides an identifier for the message to allow for idempotency, to ensure that a message is processed only once.

The submitting user is the user name of the entity that submits the message to the web services or places the message on the gateway transport. For example, if intermediary 220 places the message in web services 216, intermediary 220 runs under a user account, known as the intermediary user, that would be considered the submitting user. If source endpoint 281 submits the message to web services 216, a user account associated with source endpoint 281 would be the submitting user. The submitting user is determined by IIS 214 and gateway transport 200 through an authentication process and is not taken from the message header or the payload of the message. Techniques for authenticating a user are well known and include requesting a user name and some form of security credential such as a password (plain text, encrypted or hashed), an indication that the password is stored on the machine used by the submitting user, or a digital certificate. The security credential is examined to determine if it matches a security credential stored for the user name. If it matches, the user name is authenticated. If not, the authentication process fails and the source endpoint or the intermediary is denied access to IIS 214 or gateway transport 200.

The payload of the message may also include information that allows business class 208 to generate a source endpoint constraint such as a partner identifier or an employee identifier. This constraint helps to stop spoofing where a source endpoint associated with one partner sends a document for another partner. Thus the payload of the document must be consistent with the source endpoint in order for the changes to be committed as discussed further below.

Figure 3:
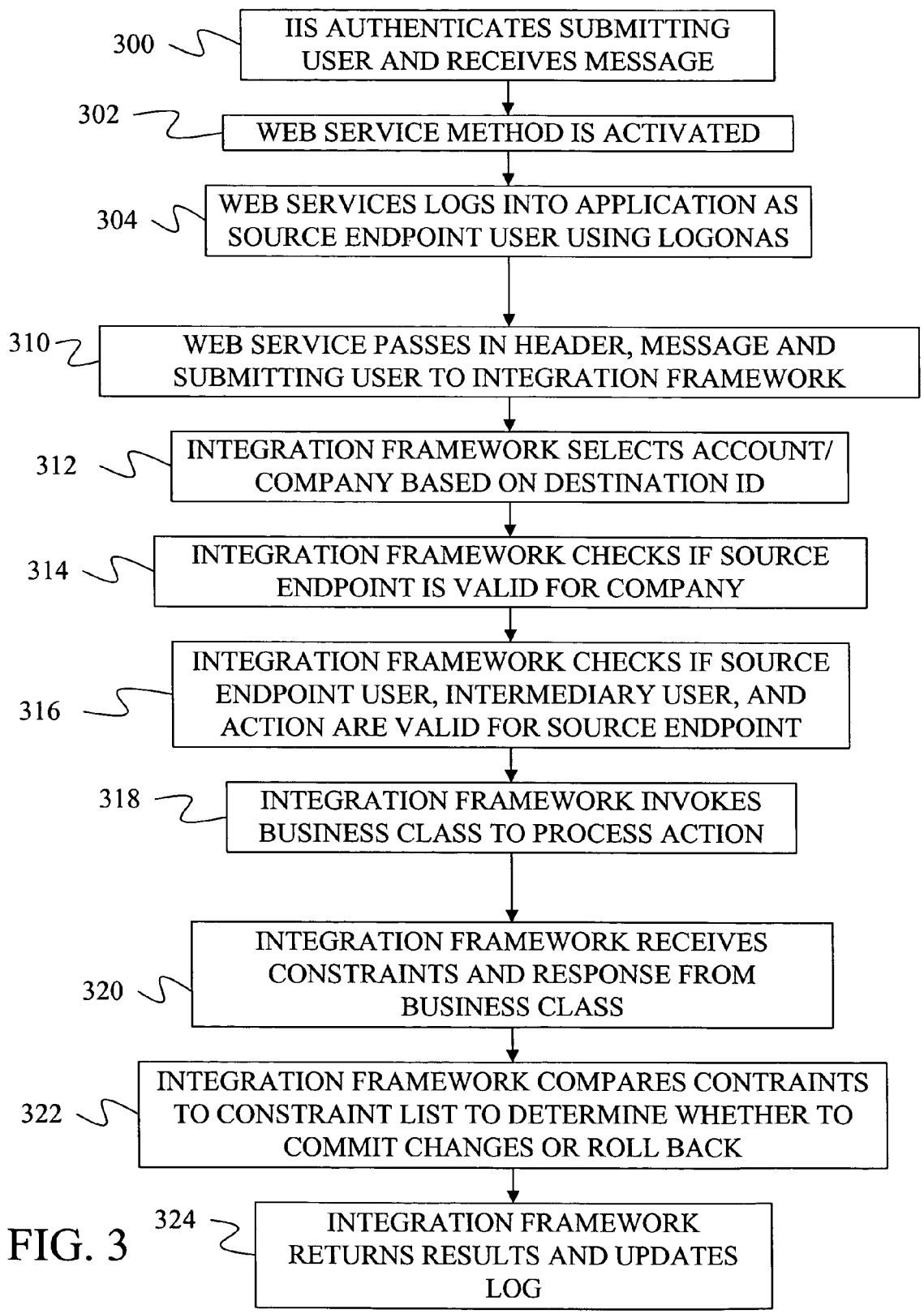
FIG. 3 is a flow diagram for passing messages through web services using the security model of one embodiment.

FIG. 3 provides a flow diagram for a process for enforcing the security model under one embodiment in which messages are passed through a web service method. In step 300, IIS 214 receives the message either from a source endpoint such as source endpoint 281 or from an intermediary such as intermediaries 220 and 223. A user account is authenticated by IIS 214 to determine a user name for the source endpoint or intermediary as described above. This user name is the submitting user. If the user account cannot be authenticated, IIS 214 returns an error and the process ends.

Once the submitting user has been authenticated, the web service method associated with the message sent to IIS 214 is activated at step 302. At step 304, web services 216 logs into secured application 104 as the source endpoint user by invoking LogonAs API 240 using the user name of the source endpoint user as a parameter. For messages that come from intermediaries 220 and 223, the source endpoint user has been placed in a header of the message by the intermediary. For messages that come from source endpoint 281, if the source endpoint does not specify the source endpoint user, the submitting user is used as the source endpoint user. If the source endpoint specifies the source endpoint user, the source endpoint user must match the submitting user.

LogonAs API 240 authenticates the proxy user account that web services 216 runs under and then sets parameters in application 104 so that business classes in application 104 run as if application 104 had been logged onto directly by the user provided in the LogonAs call.

This type of logon is referred to herein as impersonating the source endpoint user. Under some embodiments, LogonAs 240 does not require the password for the source endpoint user. As such, web services 216 is able to logon to secured application 104 as the source endpoint user without requiring the password of the source endpoint user. If the source endpoint user is not authorized to access the application, the call to LogonAs API 240 will fail.

At step 310, web services 216 pass in the header, the message body, and the submitting user to the integration framework 218 in secured application 104. In many embodiments, web services 216 uses a document context parameter to specify the message header data. Thus, the document context parameter includes fields for the source endpoint, the destination endpoint, the source endpoint user, a message ID, and the action. The submitting user is passed as a separate parameter.

At step 312, integration framework 218 uses the destination endpoint to select an account or company. Validation of the message is then performed using the attributes associated with the selected company.

At step 314, integration framework 218 locates account/company data 242 to determine if the designated source endpoint is valid for the company. If it is not valid for the company, an error is returned. If the source endpoint is valid, the process continues at step 316 where integration framework 218 retrieves source endpoint data 244 and determines if the source endpoint user, the intermediary user (if any), and the action are valid for the source endpoint. Validating the source endpoint user and the intermediary user (if any) is performed by first checking if the submitting user is different from the source endpoint user. If the submitting user is different, then the process determines if the submitting user is configured as a trusted intermediary for the source endpoint. If the submitting user is the same as the source endpoint user, the process determines if that user is configured as a source endpoint user for the source endpoint. If any of the validations fail, an error is returned to the source endpoint and the action is not performed.

At step 318, integration framework 218 invokes a method in business class 208 to process the action associated with the message. Under some embodiments, when business class 208 is invoked, the business class activates row level security for tables that it accesses. Row level security controls what data a particular user can read, write or create. Since secured application 104 is running under the source endpoint user account, this row level security will make security determinations based on the permissions granted to the source endpoint user. Thus, if a particular user is not allowed to see certain records in a table, turning on row level security will cause actions attempting to access those records to fail or to only return data that the source endpoint user is allowed to receive.

During processing, business class 208 identifies constraints based on the payload of the message. At step 320, business class 208 returns these constraints along with the response to the integration framework. At step 322, integration framework 218 compares the constraints received from the business class to a constraint list stored in source endpoint data 244 to determine whether to commit the changes made by business class 208 or whether to roll back the changes made by business class 208. The comparison with the constraint list can include indicating a favorable comparison if the business class returns a value that denotes that there is no constraint, indicating a favorable comparison based on a match between individual values for certain constraint attributes in the list and the constraints returned by the business class, and indicating a favorable comparison if complex Boolean expressions involving values for multiple constraint attributes return a true value. If the comparison is not favorable, the changes are rolled back and an error is returned to the source endpoint. If the comparison is favorable, the changes made by the business class are committed.

At step 324, integration framework 218 returns the response for the action to web services 216, which returns the response to the source endpoint. Integration framework 218 also updates a log 246 to show the action taken, the source endpoint user, the source endpoint, the destination endpoint, the Message Id, and the submitting user. This information can be used later to identify possible attempts at security breaches.

By providing for a submitting user to be different from a source endpoint user while always authenticating the submitting user at IIS 214, embodiments allow the functionality of the application to be exposed to external partners through an intermediary without exposing the application to serious security threats. Further, tying the intermediary user to the source endpoint helps to prevent source endpoints from spoofing an intermediary since even if the source endpoint is able to overcome the security at the intermediary, the security model of the present embodiments will not process the message if the intermediary user is not configured to submit on behalf of the source endpoint.

Figure 4:
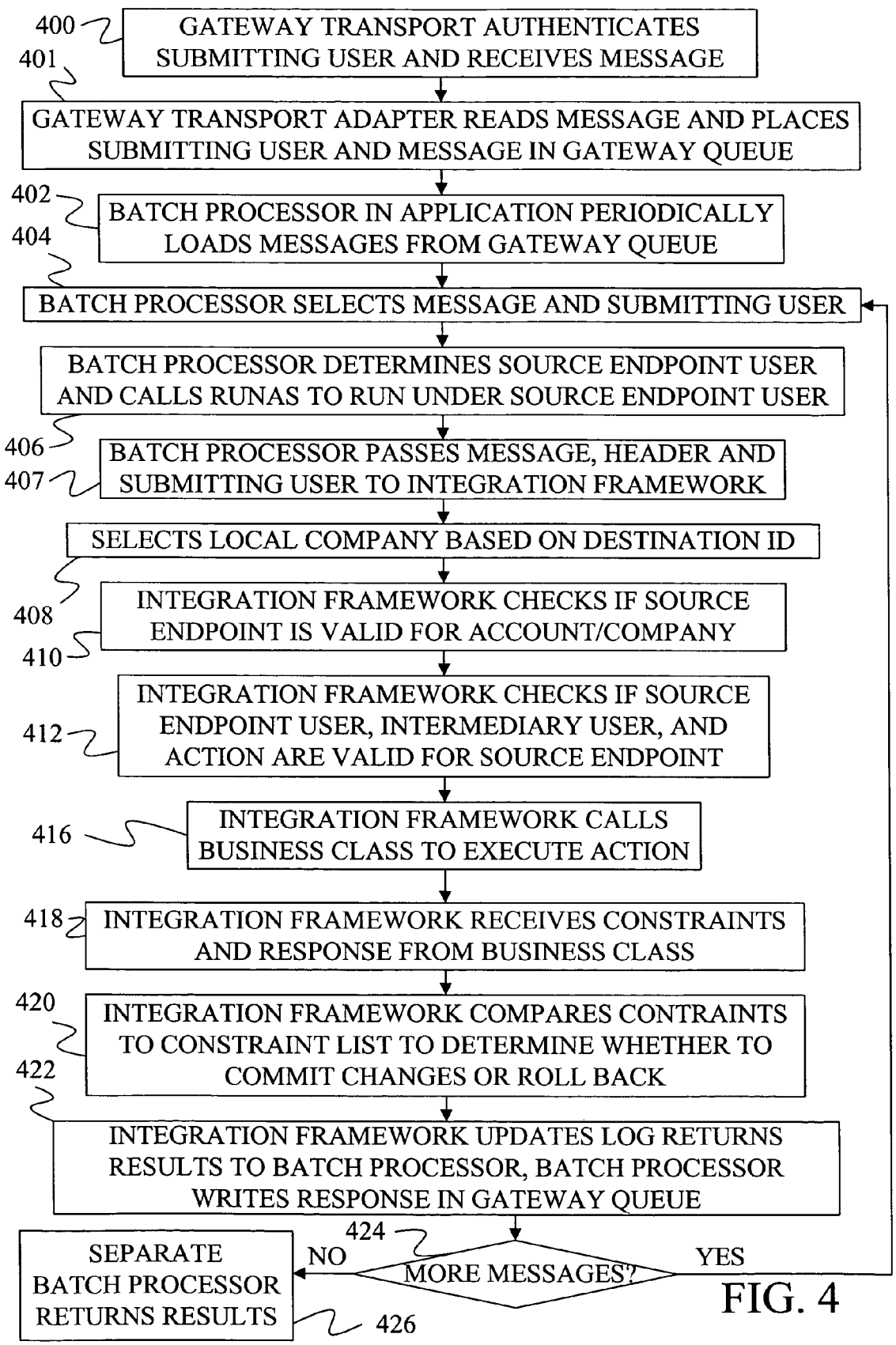
FIG. 4 is a flow diagram for passing messages through the messaging gateway using the security model of one embodiment.

FIG. 4 provides a flow diagram for a process for enforcing the security model under one embodiment in which messages are passed using gateway messaging. In step 400 of FIG. 4, gateway transport 200 authenticates the submitting user, which is either a source endpoint user or an intermediary user. Based on the authentication, gateway transport 200 accepts the message from the submitting user and stamps the message with the user name of the submitting user. At step 401, gateway transport adapter 202 reads the message and the submitting user from the transport and places the message and the submitting user in gateway queue 204.

At step 402, inbound batch processor 206 loads messages from gateway queue 204. At step 404, batch processor 206 selects a message and its corresponding submitting user. At step 406, inbound batch processor 206 determines the user name for the source endpoint user. For messages from an intermediary, the source endpoint user is extracted from the message header. For messages directly from the source endpoint, the source endpoint user is set to the submitting user. The batch processor then calls a user ID conversion 239, which maps the external source endpoint user credentials to the internal application user ID. The batch processor then calls a RunAs API 248, which allows the inbound batch processor to run as the source endpoint user using the internal application user ID. In this context, the batch processor is impersonating the source endpoint user. Note that if the source endpoint user is not authorized to call the application, the RunAs API will fail.

At step 407, inbound batch processor 206 passes the message, the message header and the submitting user to integration framework 218.

Integration framework 218 selects the account/company based on the destination endpoint in the message header at step 408 and checks if the source endpoint is valid for the account/company at step 410 using account/local company data 242. If the source endpoint is not valid for the account/company, the process ends and an error is returned.

At step 412, the integration framework 218 checks if the source endpoint user, the intermediary user, and the action are valid for the source endpoint using source endpoint data 244. Validating the source endpoint user and the intermediary user (if any) is performed by first checking if the submitting user is different from the source endpoint user. If the submitting user is different, then the process determines if the submitting user is configured as a trusted intermediary for the source endpoint. If the submitting user is the same as the source endpoint user, the process determines if that user is configured as a source endpoint user for the source endpoint. If any of the validations fail, the process ends and an error is returned.

At step 416, integration framework 218 calls a method in business class 208 to perform the action found in the message header. In some embodiments, business class 208 sets row level security for each table it accesses so that access to records in the table is based on the permissions granted to the source endpoint user. The business class 208 also extracts constraints based on the message during the execution of the action.

At step 418, integration framework 218 receives the constraints from the business class 208 as well as the response of the action. At step 420, integration framework 218 compares the constraints to the constraint list found in source endpoint data 244 for the source endpoint. If the comparison is favorable, integration framework 218 commits the changes made by business class 208. If the comparison is not favorable, integration framework 218 rolls back the changes made by business class 208.

At step 422, integration framework 218 updates log 246 with the source endpoint, the destination endpoint, the source endpoint user, the submitting user, the Message Id, and the action performed. Integration framework 218 returns the response of the action to batch processor 206, which writes the response in gateway queue 204.

At step 424, batch processor 206 determines if there are more messages to process. If there are more messages, the process returns to step 404 and steps 406 through 422 are performed for the message. When there are no more messages, the process continues at step 426, where a separate outbound batch processor (not shown) sends the response message from the gateway queue 204.

Figure 5:
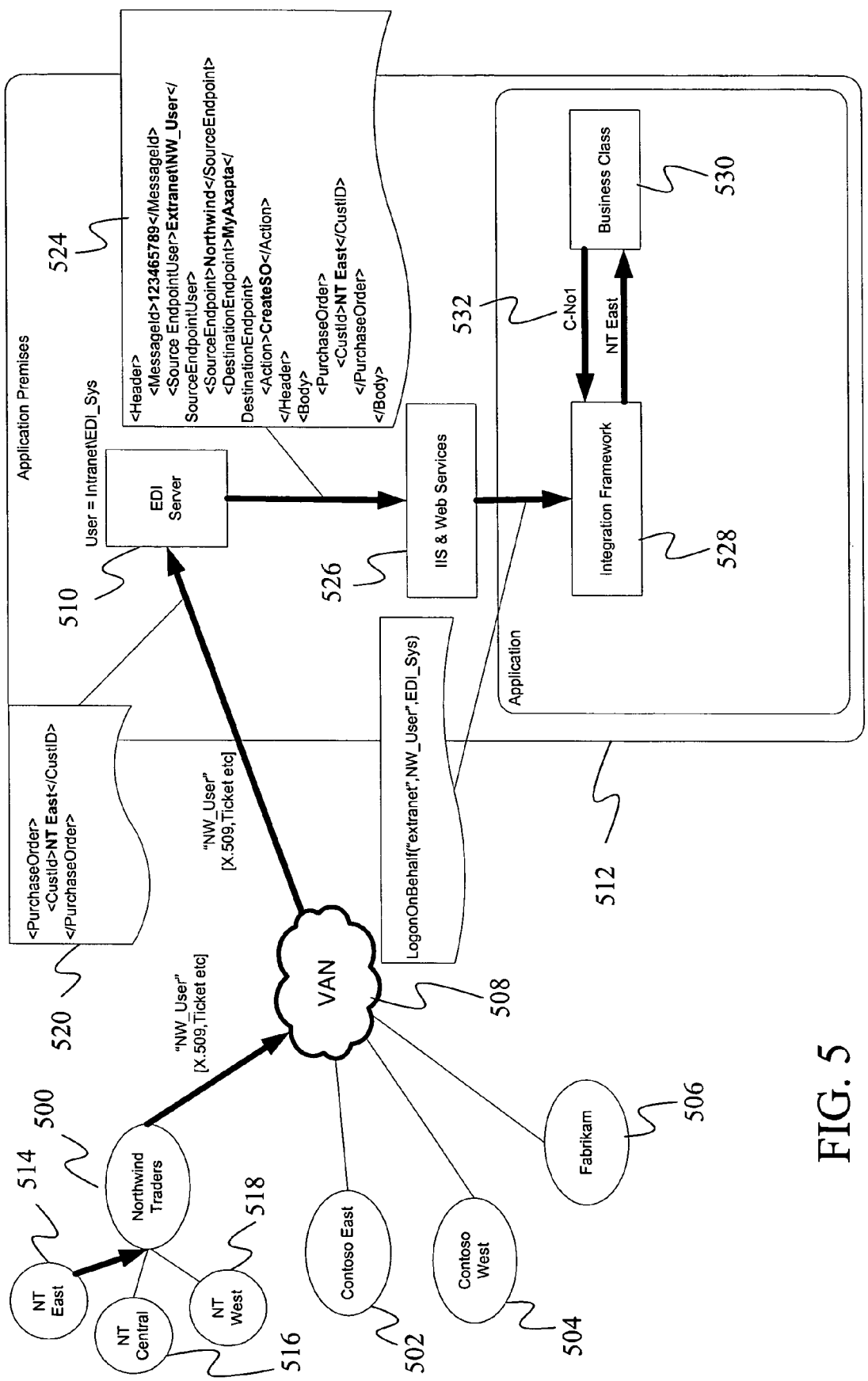
FIG. 5 is a block diagram of an example configuration using an EDI server as an intermediary.

FIG. 5 provides an example of an environment in which the security model of the present embodiments may be used. In FIG. 5, a set of trading partners 500, 502, 504 and 506 are connected through a value added network 508 to an electronic data interchange (EDI) server 510 located on application premises 512. Trading partner 500 has a set of branch locations 514, 516 and 518. In FIG. 5, a source endpoint in branch location 514 sends a purchase order 520 through value added network 508 to EDI server 510.

EDI server 510 authenticates the user as described above and determines that the source endpoint user is "Extranet\NW_User". Based on that authentication, EDI server 510 is able to determine the source endpoint to be "Northwind". EDI server 510 is also able to identify the destination endpoint as "MyAxapta" based on information in purchase order 520 or in an association between the source endpoint and the destination endpoint stored in EDI server 510. EDI server also determines an action of "CreateSO" based on purchase order 520. Using this information, EDI server 510 generates a message 524 with a message header that includes a message ID, the source endpoint user, the source endpoint, the destination endpoint, and the action. Message 524 also includes information from purchase order 520 in the body of the message.

Message 524 is provided to IIS & web services 526, which authenticate EDI server 510 to determine that the user name of the submitting user is "Intranet\EDI_Sys". The submitting user and the message are then forwarded to integration framework 528 as discussed above.

Integration framework 528 validates the message to ensure that the source endpoint "Northwind" is valid for the destination endpoint "MyAxapta." Integration Framework 528 also determines if the source endpoint user "Extranet\NW_User", the intermediary user "Intranet\EDI_Sys" and the action "CreateSO" are valid for the source endpoint "Northwind".

Integration framework 528 invokes a method in business class 530 to perform the action "CreateSO". Business class 530 performs the action and returns the response and constraint 532, which integration framework 528 checks against the constraint list. Integration framework 528 then returns the response and updates the log.

Figure 6:
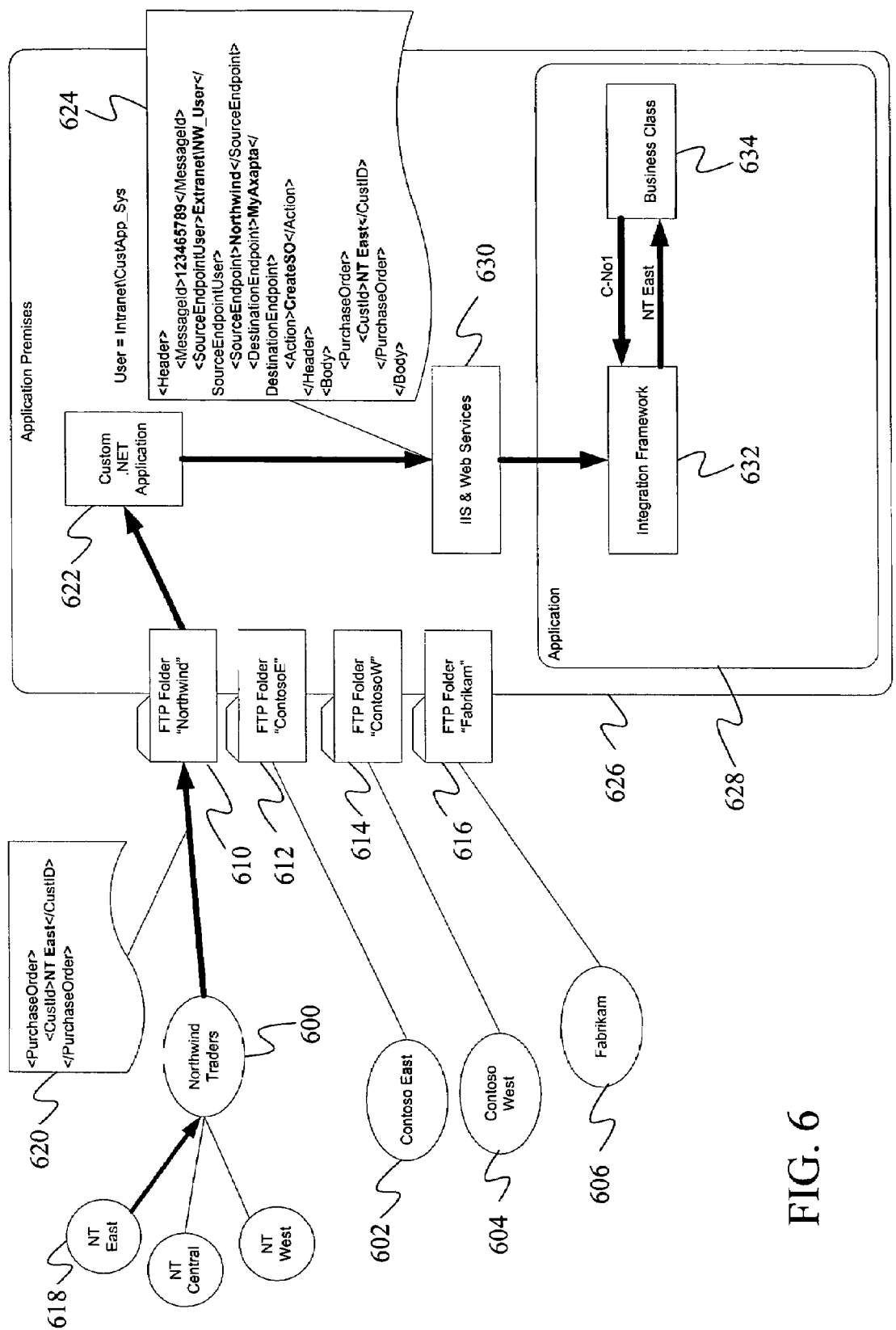
FIG. 6 is a block diagram of a configuration using a custom .NET application as an intermediary.

FIG. 6 provides an example of another environment in which the security model of the present embodiments may be used. In FIG. 6, trading partners 600, 602, 604 and 606 each have respective FTP folders 610, 612, 614 and 616. A user at branch location 618 of trading partner 600 stores a purchase order 620 on FTP folder 610 after being authenticated by the FTP server. Based on this authentication, the purchase order is stamped with the user name of the user who placed the purchase order in FTP folder 610.

A custom .NET application 622 retrieves purchase order 620 from FTP folder 610 and uses it to form a message 624. Specifically, .NET application 622 creates a header in message 624 that includes an identification of the source endpoint user "Extranet\NW_user", which is taken from the user name stamped on the message, and an identification of the source endpoint "Northwind" and the destination endpoint "MyAxapta", which are determined based on the identity of the FTP folder. .NET application 622 also fills in the action field as "CreateSO" based on the type of message that was stored in the FTP folder. .NET application 622 uses the purchase order to form the body of message 624.

.NET application 622 resides on application premises 626, which also contains application 628 and IIS & web services 630. Message 624 is provided to IIS & web services 630, which authenticates the user name of .NET application 622 as "Intranet/CustApp_Sys." In this configuration, this user name is designated as the submitting user and the intermediary user. Web services 630 provides the submitting user "Intranet/CustApp_Sys" and message 624 to integration framework 632 in application 628. Integration framework 632 authenticates the message by determining whether the source endpoint "Northwind" is allowed for the destination endpoint account "MyAxapta", and whether the source endpoint user "Extranet\NW_User", the intermediary user "Intranet\CustApp_Sys" and the action "CreateSO" are allowed for the source endpoint "Northwind". After the message has been validated, integration framework 632 invokes business class 634, which retrieves a constraint based on the body of the message. In the example of FIG. 6, the customer ID "NT East" in the body of the message is used by business class 634 to retrieve a constraint "C-No1." Integration framework 632 compares the constraint to the constraint list to determine whether to commit or roll back the changes made by business class 634. Integration framework 632 then logs the source endpoint user, the source endpoint, the destination endpoint, the submitting user the message Id and the action and returns the response from business class 634 to custom .NET application 622 through IIS & web services 630.

Figure 7:
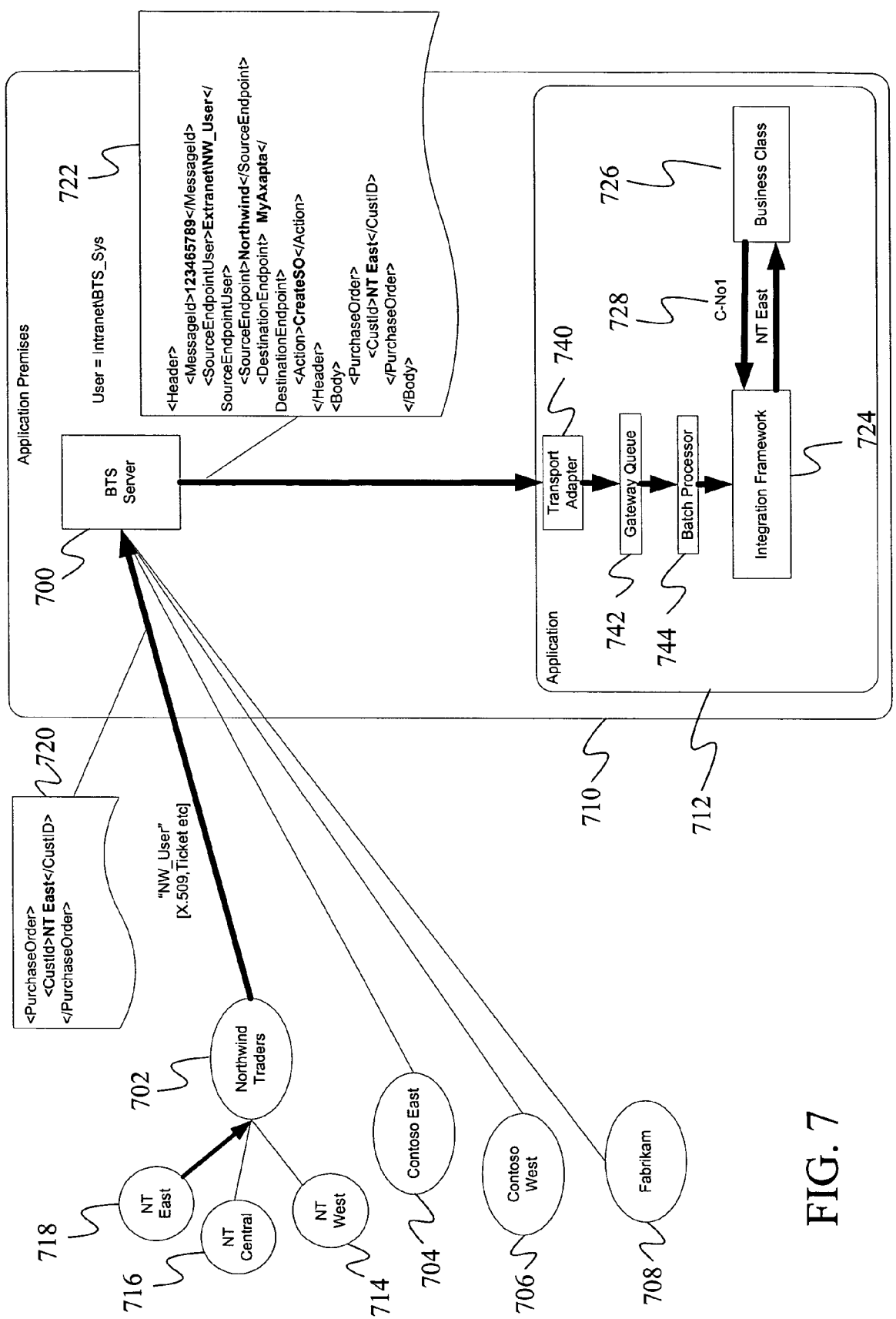
FIG. 7 is a block diagram of a configuration using a server as an intermediary.

FIG. 7 provides an example of another environment in which the security model of the present embodiments may be used. In FIG. 7, external partners 702, 704, 706 and 708 communicate with a server 700, which in one embodiment is a BIZTALK® brand server from Microsoft Corporation. Server 700 is located on premises 710, which also contains application 712. External partner 702 includes remote locations 714, 716 and 718.

A user at remote location 718 sends a purchase order 720 to server 700. Server 700 authenticates the user as "Extranet/NW_User" and determines that this user is associated with source endpoint "Northwind" and destination endpoint "MyAxapta". Server 700 creates a body for a message 722 and identifies an action of "CreateSO" based on the contents of purchase order 720. Server 700 places a message ID, the identity of the source endpoint user, the source endpoint, the destination endpoint, and the action in a message header of message 722.

Server 700 communicates with transport adapter 740 in application 712. Transport adapter 740 identifies a user account, "Intranet\BTS_Sys", associated with server 700 as the submitting user. Transport adapter places the message and the submitting user on gateway queue 742. Batch processor 744 takes the message and submitting user from the gateway queue and invokes the RunAs API to run on behalf of the source endpoint user, "Extranet\NW_User". Batch processor 744 then passes the message and the submitting user to integration framework 724.

Integration framework 724 determines if the source endpoint "Northwind" is valid for the destination endpoint "MyAxapta". Integration framework 724 also determines if source endpoint user "Extranet\NW_User", intermediary user "Intranet\BTS_Sys" and action "CreateSO" are valid for source endpoint "Northwind".

If the message parameters are valid, integration framework 724 calls business class 726, which executes the action and returns the response and constraints 728. Integration framework 724 compares the constraints to the constraint list to determine whether to commit the changes or roll back the changes. Integration framework 724 then updates the log and returns the response to processor 744. Processor 744 then places the response in the gateway queue from where the adapter 740 sends the response to server 700. Server 700 further returns the response to remote location 718.

Figure 8:
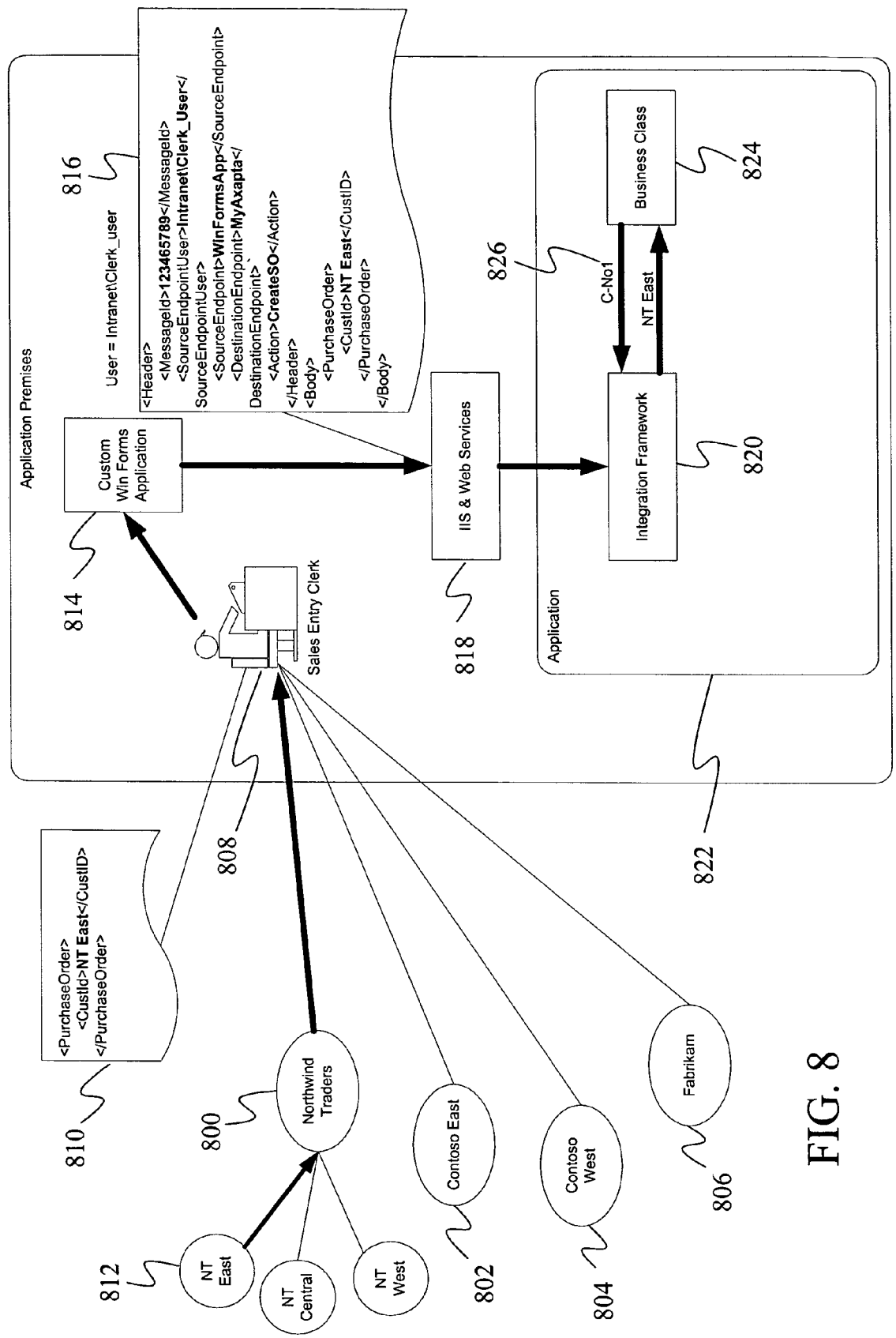
FIG. 8 is a block diagram of a configuration in which a custom Win forms application act as a source endpoint.

FIG. 8 provides a block diagram of a configuration in which a sales entry clerk 808 acts on behalf one or more partners 800, 802, 804 and 806. For example, sales entry clerk 808 can receive a telephone call from a location 812 for partner 800 and can create purchase order 810 based on that telephone call.

Sales entry clerk 808 uses custom Win forms application 814 to enter the purchase order information. Custom Win forms application 814 authenticates sales entry clerk 808 and designates the user name "Intranet\Clerk_user" for sales entry clerk 808 as the source endpoint user and "WinFormsApp" as the source endpoint. Based on information put in the purchase order 810 by sales entry clerk 808, Win Forms application 814 identifies a destination endpoint of "MyAxapta" and an action of "CreateSO". This information is put in the header of a message 816 and the body of the message is generated based on other information in purchase order 810.

Custom Win forms 814 sends message 816 to IIS & web services 818. IIS 818 authenticates the sales clerk 808 as the submitting user of message 816. Thus, sales entry clerk 808 is both the submitting user and the source endpoint user. In this case, specifying the source endpoint user on the message is optional since it is the same as the submitting user. When not specified on the message, the source endpoint user is set to be the same as the submitting user. IIS and web services 818 passes in the submitting user and the message 816 to integration framework 820 in application 822.

Integration framework 820 determines if source endpoint "WinFormsApp" is valid for destination endpoint "MyAxapta" and also determines if source endpoint user "Intranet\Clerk_user" and action "CreateSO" are valid for source endpoint "WinFormsApp". If these parameters are valid, integration framework 820 invokes business class 824 to execute the action represented in the message. Business class 824 returns the response and constraint 826, which integration framework 820 compares against the constraint list for "WinFormsApp". Integration framework 820 then updates the log and returns the response to the sales entry clerk through IIS & web services 818.

Figure 9:
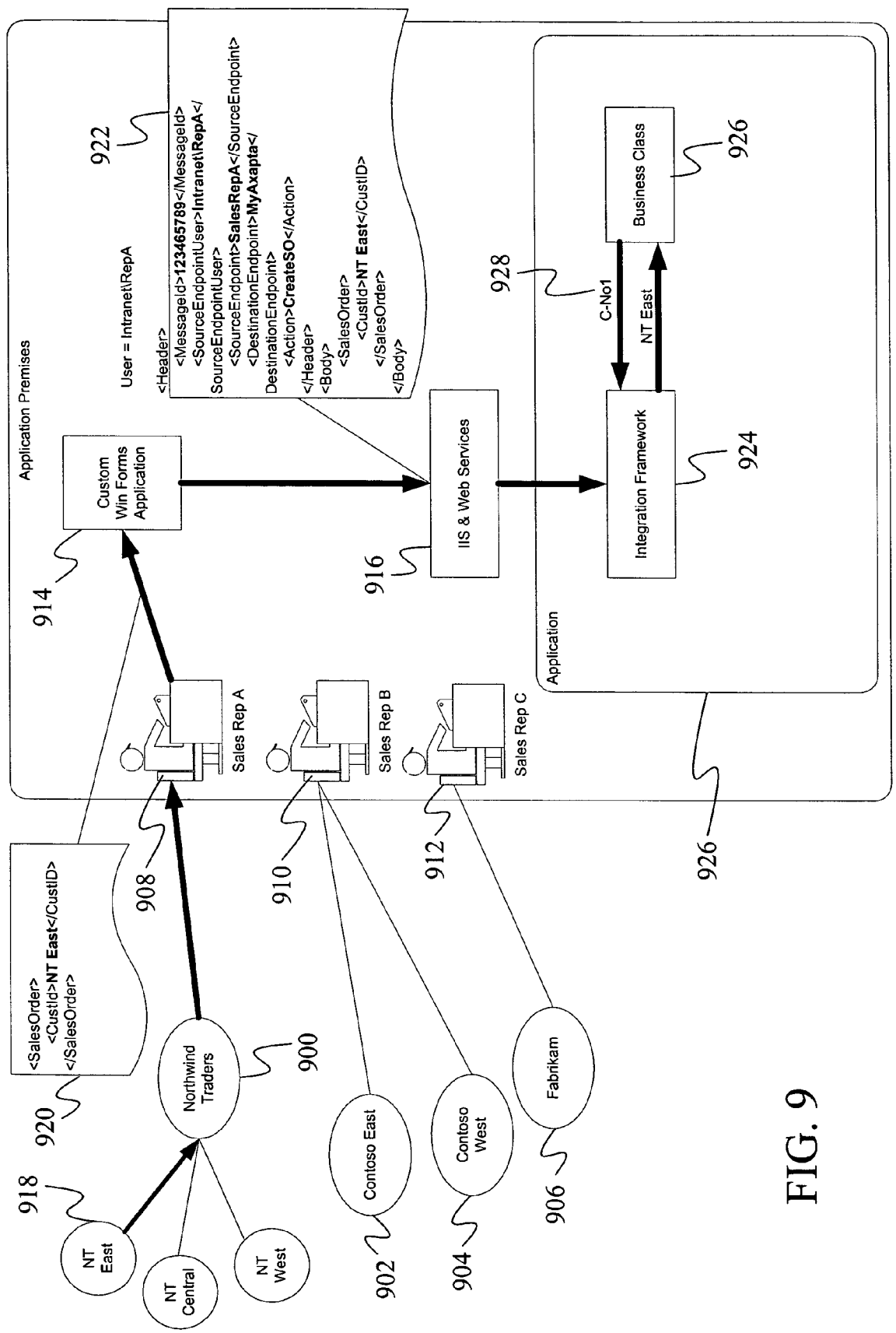
FIG. 9 is a block diagram of a configuration in which multiple sales reps act as source endpoints.

FIG. 9 provides a configuration in which trading partners 900, 902, 904 and 906 communicate with one of a plurality of sales representatives 908, 910 and 912. Each sales representative works with a custom Win Forms application 914 to generate a sales order 920. For example, a user at a remote location 918 associated with trading partner 900, contacts sales representative 908, who generates a sales order 920 on their behalf.

Custom Win Forms application 914 authenticates the sales representative and sets the user name of the sales representative "Intranet\RepA" as the source endpoint user and the source endpoint as "SalesRepA". Custom Win Forms application 914 also uses information in sales order 920 to identify the destination endpoint as "MyAxapta" and the action as "CreateSO". Using this information and other information in purchase order 920, custom Win Forms application 914 generates message 922 which includes the sales order information in the body of the message and includes a header that indicates identity of the source endpoint, the source endpoint user, the destination endpoint, the action, and a message ID.

Custom Win Forms 914 sends the message to IIS & web services 916. IIS 916 authenticates the user name "Intranet\RepA" for sales rep 908 as the submitting user. Thus the submitting user and the source endpoint user are the same. Web services 916 provides the message and the identity of the submitting user to integration framework 924 in application 926.

Integration framework 924 verifies that the source endpoint "SalesRepA" is valid for the destination endpoint "MyAxapta". Integration framework 924 also verifies that source endpoint user "Intranet\RepA" and action "CreateSO" are valid for source endpoint "SalesRepA". Integration framework 924 then activates business class 926 to perform the action. Business class 926 returns the response and constraint 928, which application interface compares against the constraint list for source endpoint "SalesRepA". Integration framework 924 then logs the transaction and returns the response to sales representative 908 through IIS & web services 916.

Figure 10:
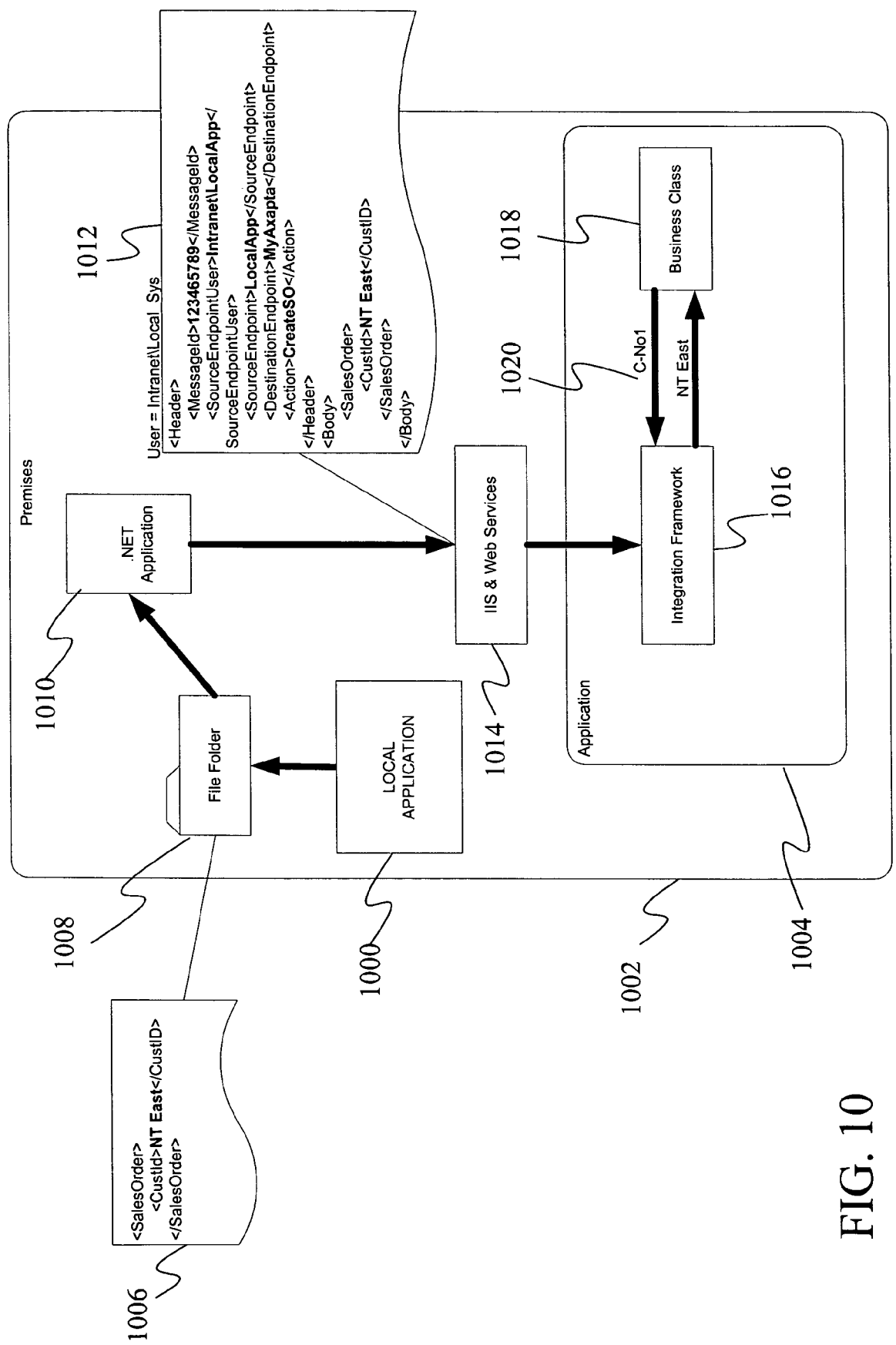
FIG. 10 provides a configuration in which a local application acts as the source endpoint and a .NET application acts as an intermediary.

FIG. 10 provides a configuration in which a local application 1000 located on the same premises 1002 as application 1004, is the source endpoint.

In FIG. 10, local application 1000 is authenticated by a server containing file folder 1008 and .NET application 1010. Local application 1000 then stores a sales order 1006 in file folder 1008. During this storage process, purchase order 1006 is stamped with the user name "Intranet\LocalApp".

.NET application 1010 retrieves purchase order 1006 from file folder 1008 and uses the information in purchase order 1006 to construct a message 1012. In particular, .NET application 1010 sets the source endpoint user to the user name "Intranet\LocalApp" for local application 1000 and the source endpoint to "LocalApp" based on the user name stamped on the message. .NET application 1010 sets the destination endpoint to "MyAxapta" based either on the source endpoint or the contents of sales order 1006 and sets the action to "CreateSO" based on the contents of sales order 1006.

Message 1012 is provided to IIS & web services 1014 which authenticates the user name "Intranet\Local_Sys" associated with .NET application 1010 as the submitting user. Web services 1014 provides the submitting user and message 1012 to integration framework 1016 in application 1004. Integration framework 1016 verifies that the source endpoint "LocalApp" is valid for the destination endpoint "MyAxapta" and verifies that intermediary user "Intranet\Local_Sys", source endpoint user "Intranet\LocalApp" and action "CreateSO" are valid for the source endpoint "LocalApp". It then activates business class 1018 to process the action.

Business class 1018 returns the response and the constraint 1020, which integration framework 1016 compares against the constraint list for the source endpoint. If a favorable comparison is made between the constraint and the constraint list, integration framework 1016 commits the changes made by business class 1018 and logs the transaction. Integration framework 1016 then returns the response through web service 1014 to application 1010.

Figure 11:
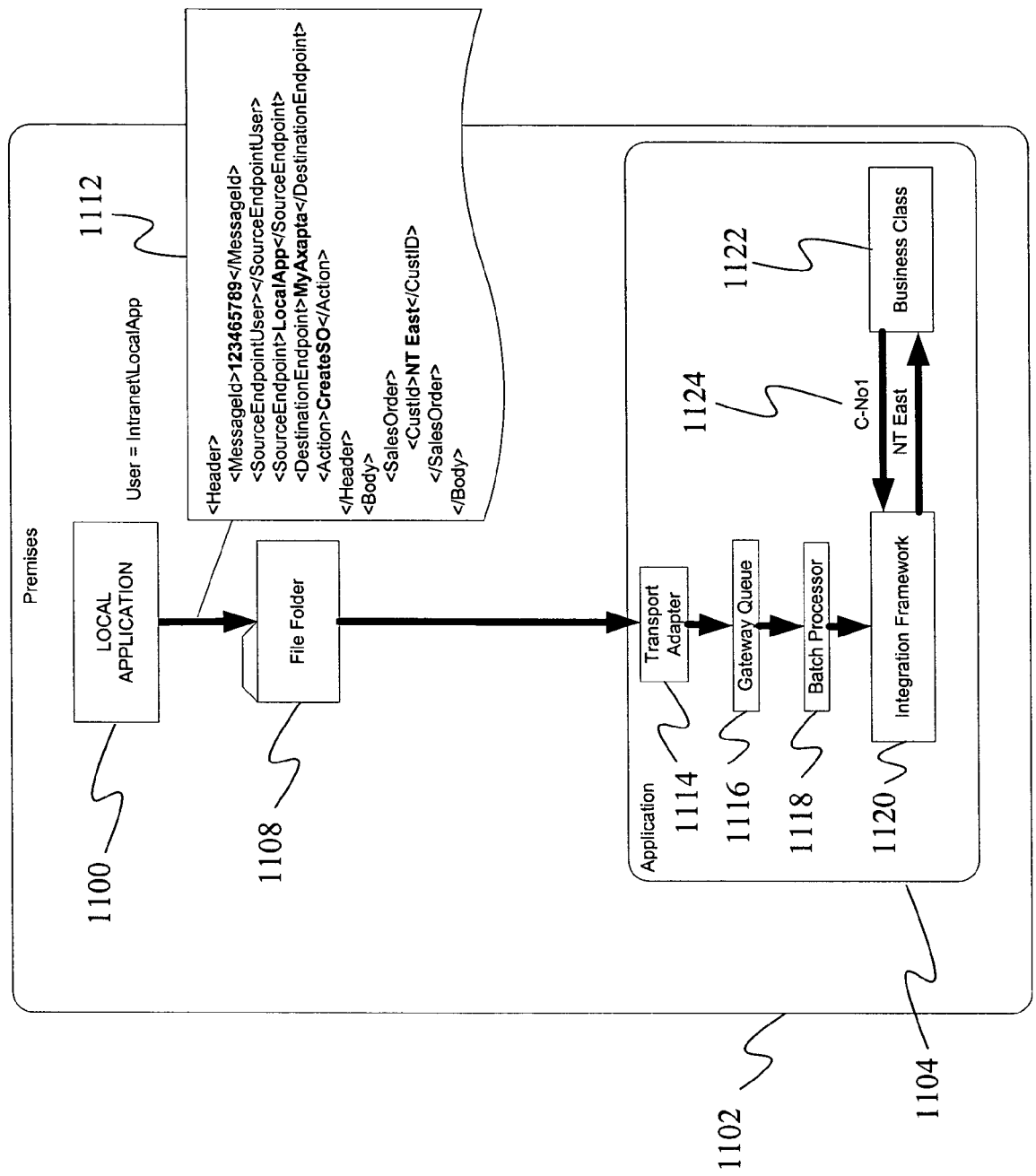
FIG. 11 provides a configuration in which a local application acts as the source endpoint that communicates through the messaging gateway.

FIG. 11 provides a configuration in which a local application 1100 located on the same premises 1102 as application 1104, is the source endpoint and communicates directly to a message gateway.

In FIG. 11, local application 1100 is authenticated by a server containing file folder 1108, which acts as a gateway transport. Local application 1100 then stores a message 1112 in file folder 1108. Message 1112 is created by local application 1100 and includes a message header that indicates that "LocalApp" is the source endpoint, "MyAxapta" is the destination endpoint and "createSO" is the action. Note that the source endpoint user is not designated in the message header because designation of the source endpoint user is optional when an intermediary is not used. During the storage process, message 1112 is stamped with the user name "Intranet\LocalApp", which is associated with application 1100, as the submitting user.

Message 1112 and the submitting user are provided to transport adapter 1114 in application 1104. Transport adapter 1114 stores message 1112 and the submitting user in gateway queue 1116. Batch processor 1118 then removes the message from gateway queue 1116 and calls the RunAs API to run under the source endpoint user.

Batch processor 1118 provides the submitting user and message 1112 to integration framework 1120. Integration framework 1120 verifies that the source endpoint "LocalApp" is valid for the destination endpoint "MyAxapta" and verifies that source endpoint user "Intranet\LocalApp" and action "CreateSO" are valid for the source endpoint "LocalApp". It then activates business class 1122 to process the action.

Business class 1122 returns the response and constraint 1124, which integration framework 1120 compares against the constraint list for the source endpoint. If a favorable comparison is made between the constraint and the constraint list, integration framework 1120 commits the changes made by business class 1122 and logs the transaction. Integration framework 1120 then returns the response to batch processor 1118, which places the response on gateway queue 1116. The response is then passed back to local application 1100.

Figure 12:
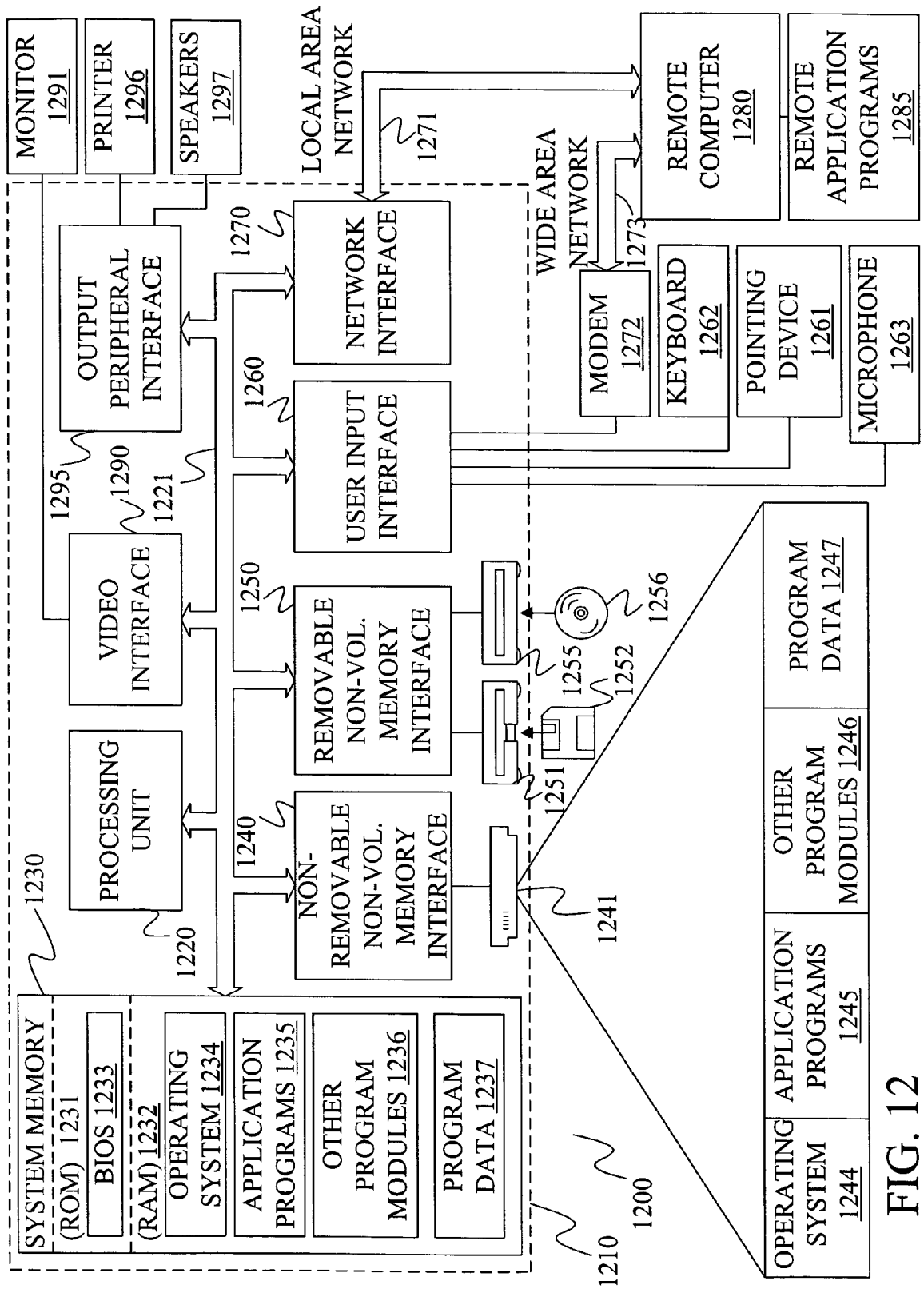
FIG. 12 provides a block diagram of a general computing environment, which may contain one or more of the servers or applications.

FIG. 12 illustrates an example of a suitable computing system environment 1200 on which embodiments may be implemented. The computing system environment 1200 is only one example of a suitable computing environment and is not intended to suggest any limitation as to the scope of use or functionality of the claimed subject matter. Neither should the computing environment 1200 be interpreted as having any dependency or requirement relating to any one or combination of components illustrated in the exemplary operating environment 1200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 12, an exemplary system for implementing some embodiments includes a general-purpose computing device in the form of a computer 1210. Components of computer 1210 may include, but are not limited to, a processing unit 1220, a system memory 1230, and a system bus 1221 that couples various system components including the system memory to the processing unit 1220.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies.

A user may enter commands and information into the computer 1210 through input devices such as a keyboard 1262, a microphone 1263, and a pointing device 1261, such as a mouse, trackball or touch pad. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections to one or more remote computers, such as a remote computer 1280. The remote computer 1280 may be a personal computer, a hand-held device, a server, a router, a network PC, a peer device or other common network node, and typically includes many or all of the elements described above relative to the computer 1210. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on remote computer 1280. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    an internet information server receiving a message sent by a user, the message comprising a source endpoint, a destination endpoint, a source endpoint user and an action;
    the internet information server authenticating the user that sent the message;
    the internet information server setting the user that is authenticated as a submitting user;
    the internet information server invoking a web service method associated with the message;
    the web service method accessing the message to retrieve the source endpoint user stored in the message;
    the web service method logging into an application while impersonating the source endpoint user stored in the message such that the application runs as if the application had been logged into directly by the source endpoint user;
    the application retrieving a source endpoint stored in the message; and
    the application determining if the submitting user is authorized to submit messages on behalf of the source endpoint.

2. The method of claim 1 wherein the submitting user is not the same as the source endpoint user.

3. The method of claim 1 further comprising:
    retrieving the destination endpoint stored in the message;
    selecting an account based on the destination endpoint; and
    determining if messages from the source endpoint are allowed for the account.

4. The method of claim 3 further comprising determining if the source endpoint user is configured for the source endpoint.

5. The method of claim 4 further comprising determining if the action is valid for the source endpoint.

6. The method of claim 1 further comprising enforcing row level security in the application using account information for the source endpoint user.

7. The method of claim 1 further comprising executing a method in the application based on the message, the method returning a constraint id, and applying the constraint id to a constraint filter to determine whether to commit changes made to a database by the method.

8. The method of claim 7 wherein the constraint filter is associated with a source endpoint found in the message.

9. A computer storage medium having stored thereon computer-executable instructions for performing steps comprising:
  receiving a message from a submitting user, the message comprising an action, a source endpoint user, a destination endpoint and a source endpoint;
  authenticating the submitting user and accepting the message if the submitting user is authenticated;
  identifying a company from the destination endpoint;
  determining whether the source endpoint in the message is valid for the company;
  comparing the source endpoint user in the message to the submitting user to determine if they are different;
  if the source endpoint user is different from the submitting user, accessing stored data for the source endpoint and determining if the submitting user is a trusted intermediary for the source endpoint based on the stored data for the source endpoint;
  if the source endpoint user is the same as the submitting user, determining if the source endpoint user is valid for the source endpoint; and
  calling a method in a business class to perform the action found in the message from the submitting user.

10. The computer storage medium of claim 9 wherein the submitting user is an intermediary user and wherein the submitting user generates the message based on information sent to the intermediary user by the source endpoint user.

11. The computer readable computer storage medium of claim 10 wherein the intermediary user authenticates the source endpoint user before generating the message.

12. The computer storage medium of claim 10 further comprising accessing an application as the source endpoint user.

13. The computer storage medium of claim 12 further comprising executing a method in the application such that the method provides a constraint identifier based on information in a body of the message, and comparing the constraint identifier to a constraint filter associated with the source endpoint.

14. A method comprising:
  retrieving an endpoint user, a destination endpoint and a source endpoint from a message;
  determining if the endpoint user is allowed to access an application associated with the message;
  determining if the source endpoint is configured for the destination endpoint;
  determining if the endpoint user is configured for the source endpoint;
  applying a payload portion of the message to a method in the application to make changes to a database and to produce a partner identifier from information in the payload; and
  a processor comparing the partner identifier to a constraint list associated with the source endpoint, and determining whether to commit the changes to the database based on the comparison between the partner identifier and the constraint list, the comparison stopping the commitment of changes if one partner sent a message payload of another partner.

15. The method of claim 14 further comprising receiving the message from a submitting user that is different from the endpoint user and authenticating the submitting user.

16. The method of claim 14 further comprising retrieving an action from the message and determining if the action is valid for the source endpoint.

* * * * *